No. 646,977. Patented Apr. 10, 1900.
R. J. GATLING.
MACHINE FOR THINNING OUT AND CULTIVATING COTTON PLANTS.
(Application filed Oct. 18, 1899.)
(No Model.) 4 Sheets—Sheet 1.

Witnesses:—

Inventor:
R. J. Gatling,
By his Attorney,

No. 646,977. Patented Apr. 10, 1900.
R. J. GATLING.
MACHINE FOR THINNING OUT AND CULTIVATING COTTON PLANTS.
(Application filed Oct. 18, 1899.)
(No Model.) 4 Sheets—Sheet 2.

Witnesses:— Inventor:
R. J. Gatling.
By his Attorney,
F. H. Richards.

No. 646,977. Patented Apr. 10, 1900.
R. J. GATLING.
MACHINE FOR THINNING OUT AND CULTIVATING COTTON PLANTS.
(Application filed Oct. 18, 1899.)
(No Model.) 4 Sheets—Sheet 3.
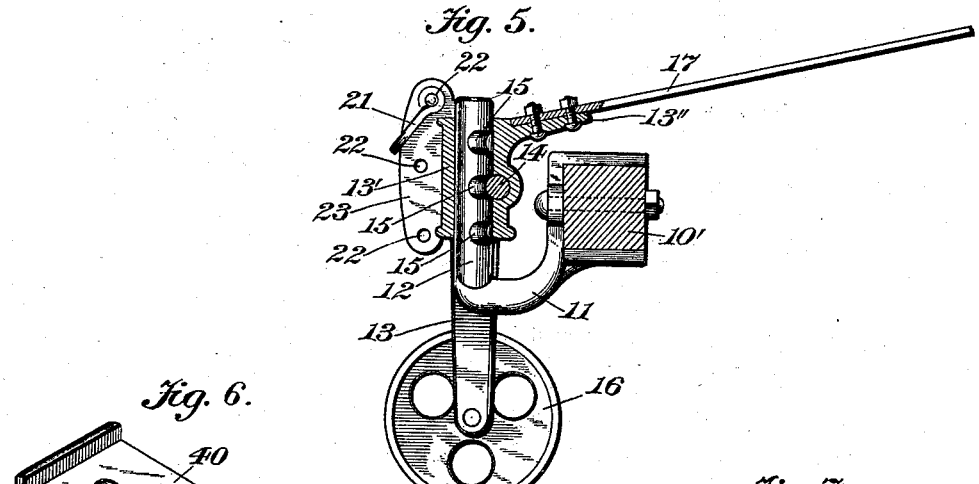
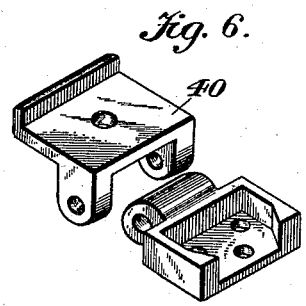
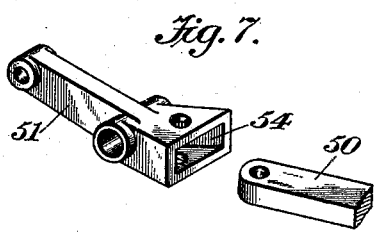
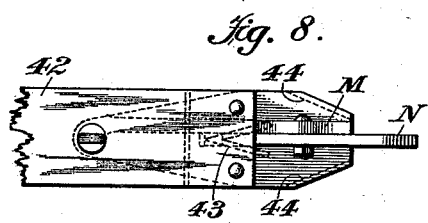
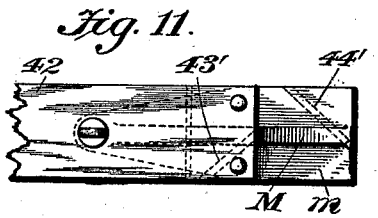
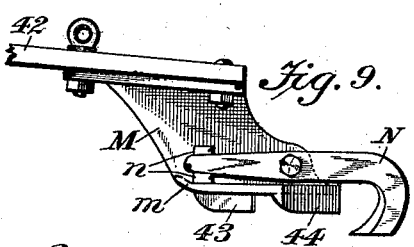
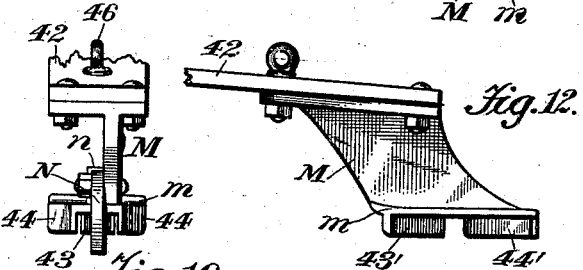
Witnesses:
Inventor,
R. J. Gatling,
By his Attorney
F. H. Richards.

No. 646,977. Patented Apr. 10, 1900.
R. J. GATLING.
MACHINE FOR THINNING OUT AND CULTIVATING COTTON PLANTS.
(Application filed Oct. 18, 1899.)
(No Model.) 4 Sheets—Sheet 4.
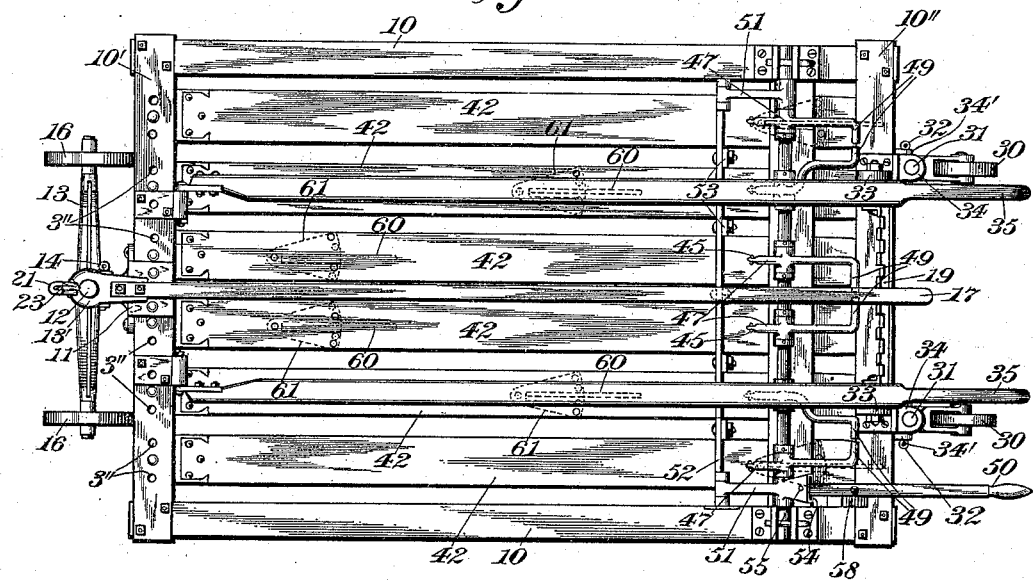
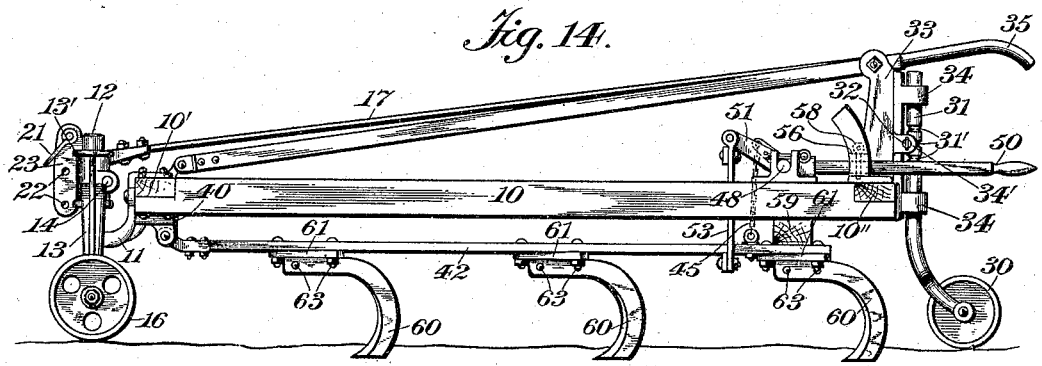
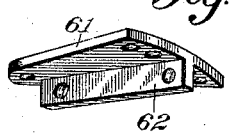

UNITED STATES PATENT OFFICE.

RICHARD J. GATLING, OF NEW YORK, N. Y.

MACHINE FOR THINNING OUT AND CULTIVATING COTTON-PLANTS.

SPECIFICATION forming part of Letters Patent No. 646,977, dated April 10, 1900.

Application filed October 18, 1899. Serial No. 733,947. (No model.)

*To all whom it may concern:*

Be it known that I, RICHARD J. GATLING, a citizen of the United States, residing in New York, in the county of New York and State of New York, have invented certain new and useful Improvements in Machines for Thinning Out and Cultivating Cotton-Plants, of which the following is a specification.

This invention relates to agricultural implements, especially to a machine adapted for thinning out and cultivating plants, more particularly cotton-plants; and it has for one object the provision of a machine constructed to work on the rows of plants crosswise or in a direction transversely of such rows to thin out or remove the excess plants and facilitate the growth of the remaining plants.

A further object of the invention is to provide a machine embodying a thinning-out instrumentality and a cultivating instrumentality, the latter effective to follow the thinning-out instrumentality and loosen the soil to enable the remaining plants to obtain more air and freedom and more readily to absorb the necessary moisture.

A further object of the invention is the provision of a cotton-plant-thinning machine in which the working devices are organized in a superior and effective manner to accomplish the desired result and which machine may also be adapted for use as an ordinary cultivator.

Figure 1:
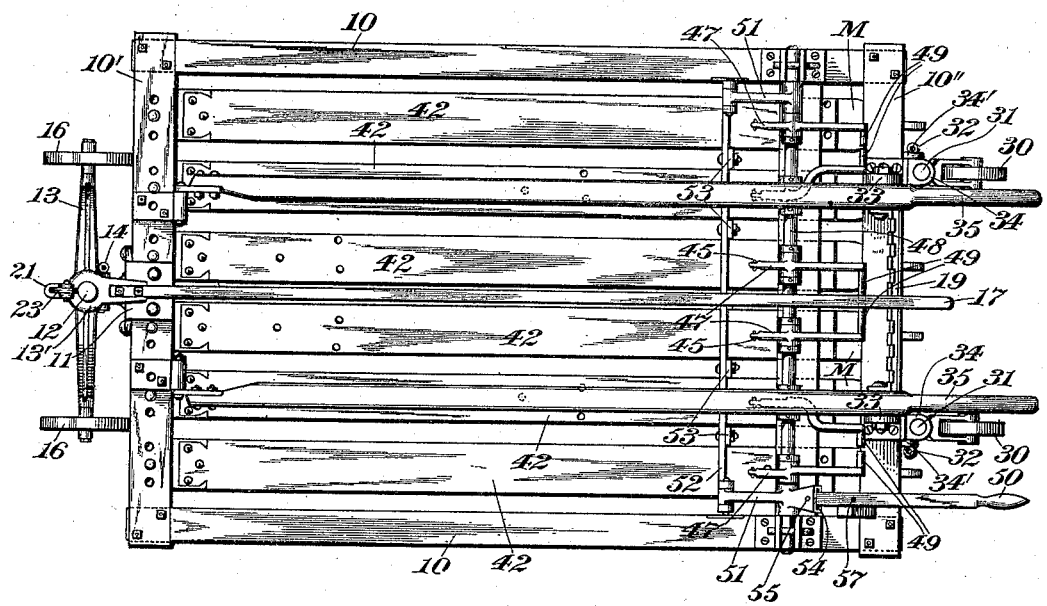
Figure 2:
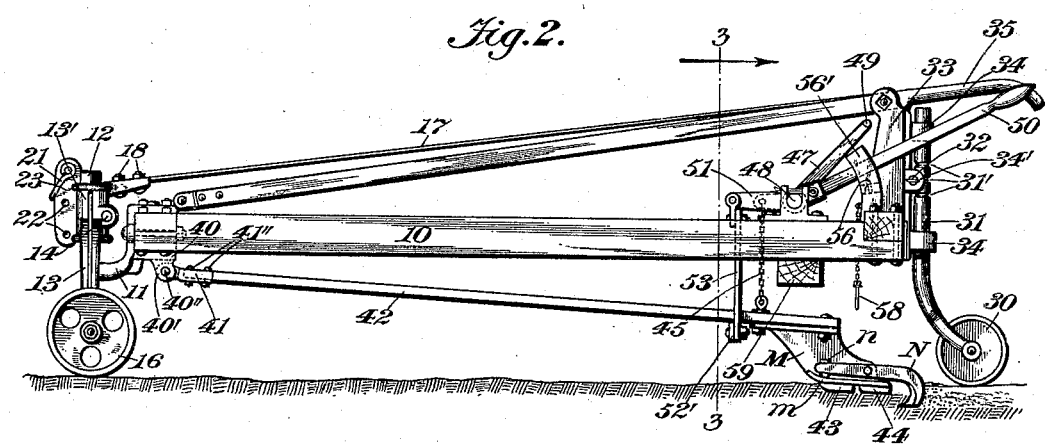
Figure 3:
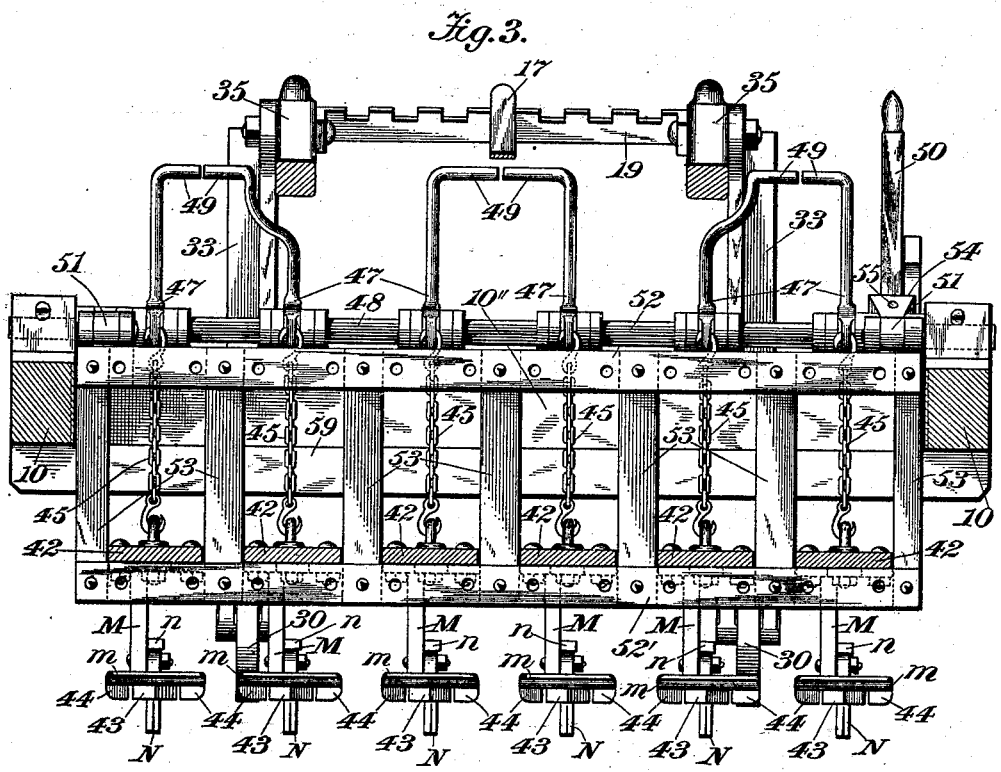
Figure 4:
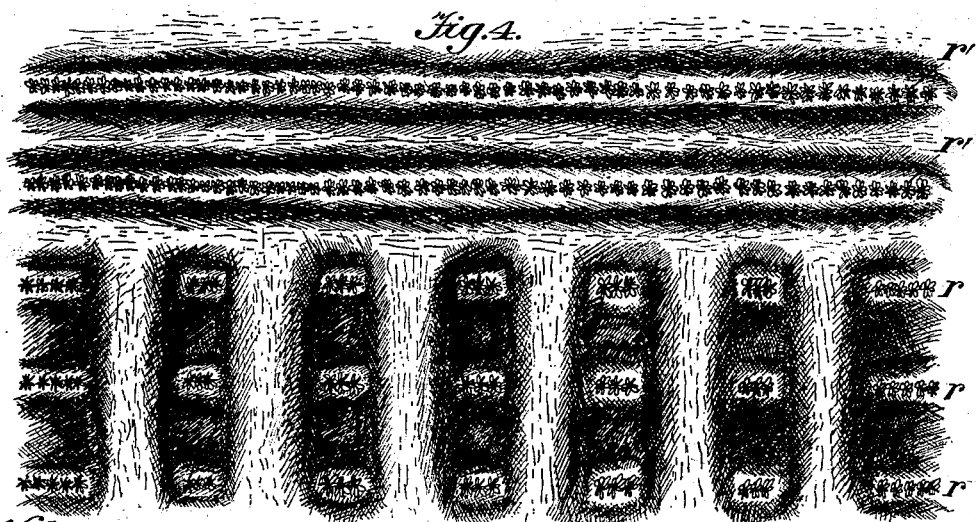

In the drawings accompanying and forming part of this specification, Figure 1 is a top view of this improved cotton-thinning machine. Fig. 2 is a side view thereof. Fig. 3 is a vertical cross-sectional view taken in line 3 3, Fig. 2, looking toward the right. Fig. 4 illustrates the manner in which the rows of cotton-plants are effectively thinned out by this improved machine in a direction transversely of the rows thereof, the upper part of said figure illustrating the rows of cotton before the same are thinned out and the lower part of such figure illustrating such rows after treatment by my method. Fig. 5 is a sectional view of the steering-wheel yoke. Fig. 6 is a detail view of one means for supporting the carriers or bars carrying the thinning-out blades. Fig. 7 is a detail view of one part of the means for raising said thinning-out blades. Fig. 8 is a top view of one form of thinning-out device, showing in connection therewith a cultivator-share, the bar for carrying said thinning-out device being broken away. Fig. 9 is a side view of the same. Fig. 10 is an end view thereof looking toward the left in Fig. 9. Fig. 11 illustrates another form of thinning-out device. Fig. 12 is a side view thereof. Fig. 13 is a top view of this improved machine organized as a cultivator, the cultivator-shares being shown in dotted lines. Fig. 14 is a side view thereof, and Fig. 15 is a perspective view of one means for supporting the said cultivator-shares.

Similar characters of reference designate like parts in all the figures of the drawings.

In cotton cultivation, since the cotton-seed is sown in such quantities as to produce a superabundance of young plants, as illustrated at *r'*, Fig. 4, it is necessary that such plants be thinned out soon after they come up, so as to facilitate the growth of the remaining plants. This thinning or "blocking" out, as it is usually called, of the rows of plants has heretofore, so far as I am aware, been performed by hand labor by the use of a weeding-hoe and at considerable cost, the laborer moving longitudinally of the rows *r* and *r'* and cutting or chopping out the plants, so as to leave the same in blocks. In a large plantation this requires considerable time, while it is of little benefit so far as the actual cultivation of the remaining plants is concerned, it being afterward necessary to run a cultivator between the rows in order to facilitate the growth of the plants.

The object of the present invention, therefore, is to provide an improved cotton-thinning machine organized to pass crosswise or in a direction transversely of the rows to enable the vehicle to scrape or cut away a part of the growing plants and form rows transversely of the originally-planted rows, as illustrated, for instance, at *r*, Fig. 4.

By the use of the present improvement the work of thinning out the plants will not only be effectively performed at much less cost of time and labor, but the soil will be also stirred and cultivated between the rows transversely thereof, while the grass and weeds that may be in the line of travel of the device are uprooted. Moreover, since the present improvement can be readily adapted for use as an ordinary cultivator it follows that it may be used for nearly all of the work necessary to be performed in the cultivation of the cotton-plant.

This cotton-thinning machine comprises in one form thereof herein shown and described and which may be its preferred form, if desired, some suitable supporting means or frame, shown herein comprising a pair of side members 10 and a pair of end connecting members 10' and 10". For supporting the frame at the front end thereof steering-wheels 16 are provided, shown carried by a suitable yoke 13, having a socket 13', into which a spindle or bolt 12, carried by a depending bracket 11, attached to the connecting member 10', projects. The connection between the steering-wheel yoke and the frame is such that the front end thereof may be raised or lowered, whereby the working devices carried by the frame may project any desired depth into the soil, and for this purpose the spindle 12 is shown provided with a series of grooves or notches 15, into which projects a removable pin 14, whereby on the removal of such pin the spindle, and thereby the front end of the frame, may be raised or lowered and maintained in such adjusted position by the pin 14. For hitching the team to the machine the yoke 13 is provided with a loop 21, adapted to be secured in either one of the apertures 22, provided for that purpose in a web 23, formed as a part of the socket member 13' of the yoke.

For steering the implement a suitable lever 17 is bolted to the socket member 13", the handle thereof being adjacent to the rear end of the frame and maintained in any desired position by a rack or notched bar 19, bolted intermediate a pair of upright brackets 33, secured to the rear frame member 10". In the use of this steering means it will be readily seen that the vehicle can be steered independently of the direction of pull of the team.

For supporting the rear end of the frame suitable wheels 30 are provided, carried by a pair of spindles 31, each mounted in bearings 34, carried on the upright brackets and the frame, respectively. These spindles are provided with a series of annular grooves 31', adapted to be engaged by pins 32, inserted in ears 34', carried by the brackets 33, whereby the rear end of the frame may be raised or lowered on the withdrawal of the pins.

By the organization above described it will be seen that the entire frame may be raised or lowered relatively to its supporting-wheels.

For guiding the rear end of the frame suitable hand-bars 35 are secured at their front ends to the frame member 10' and bolted adjacent to their handles to the upright brackets 33.

The means for thinning out the plants in a direction transversely of the planted rows thereof comprise in the present instance a plurality of improved hoe-blades or cutters 43 and 44. These hoe-blades are shown so mounted on the frame that they may be raised or lowered individually or in pairs, or all may be raised or lowered simultaneously, as occasion may require. These cutters are also preferably so mounted on the frame that on the removal of one or more of the supporting means therefor the remaining ones can be shifted laterally, so that the width of the rows may be greater or less, as desired. For this purpose the front member 10' is shown provided with a series of apertures 3", in which the bolts carrying the bars may be inserted.

In the present instance the hoe-blades are shown carried by a plurality of adjustable carriers or bars 42, pivotally secured adjacent to the front end of the frame by suitable brackets 40. The rear end of each of these bars has secured thereto the hoe-blades or cutters 43 and 44 and also means for regulating the depth of cut of said blades. Bolted to each of these bars is a downwardly-extending plate or web M, terminating at its under edge in a relatively-wide flat plate $m$, adapted to engage the soil in a manner similar to that of a sled-runner and effective to limit the depth of cut of the blades. Carried on the under side of this plate are the cutters or blades 43 and 44 for thinning the plants. In the present instance the blades are shown integral with the plate. In one form thereof these cutters are shown comprising two sets 43 and 44, each set comprising a pair of cutters, each located at an angle to the direction of travel of the machine, whereby they diverge from each other. In the present instance the cutters 43 are so located that they form a V-shaped cutter effective to quickly penetrate the bunches of cotton-plants and uproot and throw the plants in both directions outwardly, while the cutters 44 are so located that they coact with the cutters 43 to throw the plants back again, and thus insure the thorough hoeing of the plants and the thinning out of the rows.

In the form of cutters shown in Fig. 11 the work of each set of blades shown in Fig. 8 is performed by two blades 43' and 44', each working at an angle to the path of the machine and each intersecting the plane of its companion cutter. In this form thereof both cutters serve to throw the plants toward the center of the row being formed.

Each of the webs or plates M carries a cultivator share or point N, secured thereto, the front end thereof fitting into a guide $n$, formed on said web. This share works in the path of the hoeing-blades, whereby the uprooting of the weeds between the newly-formed rows and the cultivation of the remaining plants may be effected simultaneously with the thinning out of the plants.

For raising or lowering the hoe-blade-carrying bars 42 either all together or in pairs or independently of each other suitable means is provided. This means in the present instance comprises a rock-shaft 48, mounted on the frame. Loosely mounted on this rock-shaft is a series of levers 47, each pair of which has its handles 49 turned toward each other, whereby a pair of such levers may be operated simultaneously by one hand of the operator or each of said levers may be shifted independently of its companion levers. Each of these levers is connected to its respective bar 42 by a suitable connector or chain 45, whereby said bars may be raised or lowered in pairs or independently of each other to thereby raise the hoeing-blades out of contact with the soil or to lower the same into such contact. By this organization when the cotton-plants are not sufficient in number to warrant a further thinning out thereof it will be seen that any of the cutters can be quickly thrown out of operation by raising one or more of the supporting-bars. For raising all of said bars simultaneously a pair of arms 51 is rigidly secured to the rock-shaft 48, said arms having connected therewith a pair of members 52 and 52', one, 52', running under the bars 42 and the other running above the same, such members being connected at each side of the bars 42 by a guide member 53, whereby each of said blade-supporting bars is maintained in its proper working position against lateral movement. One of the shaft-arms 51 is provided with a socket 54, in which the lower end of a lever 50 is pivoted for slight lateral movement, whereby it may be swung clear of a projection hereinafter described. On the depression of said lever 50 all of the bars 42 will be raised, such bars being maintained in their raised position by suitable locking means, shown in the present instance as an apertured projection 56, carried by an arm 56', fixed to the frame, the aperture thereof registering with an aperture 57 in the lever 50 when the same is shifted sidewise and under such projection 56, a suitable pin 58 being provided for insertion into said apertures to maintain the lever in position. When the bars are in their raised positions, they are brought into engagement with a cross-beam 59, whereby they are steadied. In this position, if desired, in place of the hoe-blades or cutters suitable cultivator-shares 60 or other instrumentalities may be attached, as shown, for instance, in Figs. 13 and 14, to said bars 42 through the medium of a plate 61, having a rib 62, by bolts 63, passing through perforations in said rib, and the machine used as an ordinary cultivator.

In the use of this improved machine the same is driven transversely of the rows, whereby said rows are blocked out, as indicated by $r$, Fig. 4, the cutters acting to hoe or cut away the plants to form rows, and thereby facilitating the growth of the remaining plants, the cultivation of such plants being also assisted by the cultivator-shares N when the same are used. By this method of thinning out the plants it will be seen that the machine can be driven in a direction parallel with the originally-planted rows and also transversely thereof, owing to the formation of the new rows, so that the young plants are cultivated on all four sides of each block thereof instead of, as heretofore, on but two sides thereof, whereby the growth and development of the same will, it is believed, be materially increased.

Having described my invention, I claim—

1. In a plant-thinning-out implement, the combination, with a support or frame, of a plurality of shiftable bars supported thereby; a rock-shaft mounted on said frame and connected with said bars; a plurality of levers loosely mounted on said shaft, one for, and connected with, each of said bars, whereby each of said bars may be raised or lowered independently of its companion bars; and means for actuating said shaft thereby to raise or lower all of said bars together.

2. In a plant-thinning-out implement, the combination, with a support or frame, of a plurality of shiftable bars supported thereby; a shaft mounted on said frame; a plurality of levers loosely mounted on said shaft, one for, and connected with, each of said bars, whereby each of said bars may be raised or lowered independently of its companion bars, and each pair of said levers having handles turned toward each other whereby a pair of said bars may be raised or lowered by one hand of the operator.

3. In a machine of the class specified, the combination, with a support or frame, of a series of bars shiftably supported thereby, each provided with one or more soil-working devices, and means organized to permit the shifting of any one or any two of said bars together and independently of the other bars of the series.

4. In a plant-thinning-out implement, the combination, with a support or frame, of a plurality of shiftable bars supported thereby for lateral adjustment; a shaft mounted on said frame; a plurality of levers loosely mounted on said shaft, one for, and connected with, each of said bars, whereby each of said bars may be raised or lowered independently of its companion bars; a lever secured to said shaft; and means supported by said shaft and effective on the actuation of said levers to raise or lower all of said bars together.

5. In a machine of the class specified, the combination with a support or frame, of a plurality of carriers supported thereby, each provided with one or more soil-working devices; means for shifting each of said carriers independently of the others, and organized to permit the shifting of any two of said carriers together; and means for shifting all of said carriers simultaneously.

6. In a machine of the class specified, the combination with a support or frame, of a plurality of bars pivotally secured thereto, each provided with a plurality of soil-working devices; means for shifting said bars independently of each other or in pairs; and independent means for shifting all of said bars together.

7. In a plant-thinning-out implement, the combination, with a support or frame, of a plurality of shiftable bars supported thereby; a shaft mounted on said frame; a plurality of levers loosely mounted on said shaft, one for, and connected with, each of said bars, whereby each of said bars may be raised or lowered independently of its companion bars; a lever secured to said shaft; and a frame connected to said shaft and inclosing said bars and effective on the actuation of said lever to raise or lower all of the bars together.

8. In a plant-thinning-out implement, the combination, with a support or frame, of a plurality of shiftable bars supported thereby; a shaft mounted on said frame; a plurality of levers loosely mounted on said shaft, one for, and connected with, each of said bars, whereby each of said bars may be raised or lowered independently of its companion bars; a lever secured to said shaft; and a frame connected to said shaft and inclosing said bars and effective on the actuation of said lever to raise or lower all of the bars together, said frame having guide members located at each side of said shiftable bars.

9. In an implement of the class specified, the combination, with a support or frame, of a plurality of bars pivotally secured thereto, each provided with one or more soil-working devices, and means for raising or lowering each of said bars independently of its companion bars and including a lever connected to each bar thereof, each pair of said levers having its handles turned toward each other whereby a pair of bars may be raised or lowered together.

10. In a machine of the class specified, the combination, with a support or frame, of a plurality of bars pivotally secured thereto, each provided with one or more soil-working devices; means for raising or lowering each of said bars independently of its companion bars and including a rock-shaft and levers loosely mounted thereon, each pair thereof having its handles turned toward each other, whereby a pair of said bars may be raised simultaneously; and means for raising and lowering all of said bars together and including a lever fixed to said shaft.

11. In a machine of the class specified, the combination, with a support or frame, of a plurality of bars pivotally secured thereto, each provided with a plurality of hoe-blades or cutters; means for raising and lowering each of said bars independently of its companion bars and including levers, each pair thereof having its handles turned toward each other, whereby a pair of said bars may be raised together; means for raising and lowering all of said bars together; and means for maintaining said bars in their raised position.

12. In a plant-thinning-out implement, the combination, with a support, of a plurality of shiftable bars supported thereby; a frame inclosing said bars; guide members secured to said frame and located at each side of said bars; means for raising or lowering said frame, and thereby all of the bars together; and means for raising each of said bars independently of its companion bars or a pair of such bars together.

13. In an implement of the class specified, the combination, with a support or frame, of a plurality of bars pivotally secured thereto, each provided with one or more soil-working devices; a rock-shaft mounted on said frame; a member located under said bars and connected with said rock-shaft; and an actuator for operating said shaft thereby to raise or lower all of said bars together.

14. In an implement of the class specified, the combination, with a support or frame, of a plurality of bars pivotally secured thereto, each provided with one or more soil-working devices; a rock-shaft mounted on said frame; arms rigidly secured to said shaft; a member extending under all of said bars and connected with said arms; means for actuating said shaft thereby to raise or lower all of said bars together; and means for locking said bars in their raised position.

15. In a machine of the class specified, the combination, with a support or frame, of a plurality of bars pivotally secured thereto, each provided with one or more soil-working devices; a rock-shaft mounted on said frame; rock-arms rigidly secured thereto and in operative connection with said bars, one of said arms having a socket; a lever fitting into said socket and having a shiftable movement relatively thereto; and means for locking said lever, thereby to maintain the bars in a raised position.

16. In a machine of the class specified, the combination, with a support or frame, of a bar supported thereby and provided with two sets of soil-working devices, one set located in advance of the other, and effective to throw the plants outwardly, and the other set located and effective to throw such plants inwardly.

17. In a machine of the class specified, the combination, with a support or frame, of a carrier supported thereby and provided with two sets of hoe-blades or cutters, one set located in advance of and in a plane intermediate the cutters of the other set and effective to throw the plants outwardly, and the other set located and effective to throw such plants inwardly.

18. In a machine of the class specified, the combination, with a support or frame, of a carrier supported thereby and provided with two sets of angularly-disposed hoe-blades or cutters, the blades of one set diverging from their front ends, and the blades of the other set converging from front ends.

19. In a machine of the class specified, the combination, with a support or frame, of a carrier supported thereby and provided with two sets of angularly-disposed hoe-blades or cutters, the blades of one set being united and diverging from their front ends, and the blades of the other set converging from their front ends.

20. In a machine of the class specified, the combination, with a support or frame, of a plurality of carriers supported thereby, each provided with two sets of angularly-disposed hoe-blades or cutters, the blades of one set diverging from their front ends, and the blades of the other set converging from their front ends; and means for raising and lowering said carriers independently or together.

21. In a machine of the class specified, the combination, with a support or frame, of a carrier supported thereby and provided with two sets of hoe-blades or cutters, one set located and effective to throw the plants outwardly and the other set located and effective to throw such plants inwardly, and means for regulating the depth of cut of said blades.

22. In a machine of the class specified, the combination, with a support or frame, of a carrier secured thereto and provided with means adapted to engage the surface of the soil, and a hoe-blade or cutter located at the under side of said means and at an angle thereto.

23. In a machine of the class specified, the combination, with a support or frame, of an adjustable carrier secured thereto and provided with a plate adapted to engage the surface of the soil; a hoe-blade or cutter located at the under side of said plate and at an angle thereto; and means for raising and lowering said carrier.

24. In a machine of the class specified, the combination, with a support or frame, of a plurality of carriers supported thereby, each provided with two sets of angularly-disposed hoe-blades or cutters, the blades of one set diverging from their front ends, and the blades of the other set converging from their front ends, and means secured to each of said carriers for regulating the depth of cut of said blades.

25. In a machine of the class specified, the combination, with a support or frame, of a plurality of adjustable carriers secured thereto; a plate secured to each carrier and adapted to engage the surface of the soil; two sets of angularly-disposed hoe-blades or cutters located at the under side of each plate, the blades of one set diverging from their front ends, and the blades of the other set converging from their front ends.

26. In a machine of the class specified, the combination, with a support or frame, of a carrier secured thereto and provided with a hoe-blade or cutter, and a cultivator-share secured to said carrier.

27. In a machine of the class specified, the combination, with a support or frame, of a carrier adjustably secured thereto; means for raising and lowering said carrier; a hoe-blade or cutter secured to said carrier; and a cultivator-share secured to said carrier in the rear of said blade.

28. In a machine of the class specified, the combination, with a support or frame, of a plurality of carriers secured thereto, each provided with a pair of hoe-blades or cutters, each disposed at an angle to the path of the machine and in a plane intersecting the plane of its companion cutter; and a cultivator-share secured to each carrier.

29. In a machine of the class specified, the combination, with a support or frame, of a plurality of carriers adjustably secured thereto, each provided with a pair of hoe-blades or cutters, each disposed at an angle to the path of the machine and in a plane intersecting the plane of its companion cutter; a cultivator-share secured to each carrier; means for regulating the depth of cut of said blades; and means for raising and lowering each of said carriers independently of each other or together.

30. In a machine of the class specified, the combination, with a support or carrier, of a plurality of carriers supported thereby, each provided with two sets of hoe-blades or cutters, one set located in advance of and in a plane intermediate the cutters of the other set and effective to throw the plants outwardly, and the other set located and effective to throw such plants inwardly; and a cultivator-share secured to each of said carriers.

31. In a machine of the class specified, the combination, with a support or frame, of a plurality of carriers adjustably supported thereby, each provided with two sets of hoe-blades or cutters, one set located in advance of and in a plane intermediate the cutters of the other set and effective to throw the plants outwardly, and the other set located and effective to throw such plants inwardly; a cultivator-share secured to each of said carriers; and means for raising and lowering said carriers independently or together.

32. In a machine of the class specified, the combination, with a support or frame, of a plurality of carriers supported thereby, each provided with two sets of angularly-disposed hoe-blades or cutters, the blades of one set diverging from their front ends, and the blades of the other set converging from their front ends; and a cultivator-share secured to each of said carriers.

33. In a machine of the class specified, the combination, with a support or frame, of a plurality of adjustable carriers secured thereto; a plate secured to each of said carriers and adapted to engage the surface of the soil; two sets of angularly-disposed hoe-blades or cutters located at the under side of each plate, the blades of one set diverging from their front ends, and the blades of the other set converging from their front ends; means for raising and lowering said carriers independently or together; and a cultivator-share carried by each of said carriers.

34. In a machine of the class specified, the combination, with a support or frame, of running-gear including steering mechanism therefor; a plurality of carriers adjustably supported on said frame, each provided with a plate adapted to engage the surface of the soil; two sets of angularly-disposed hoe-blades or cutters located at the under side of each plate, the blades of one set diverging from their front ends, and the blades of the other set converging from their front ends.

35. In a machine of the class specified, the combination, with a support or frame, of running-gear including steering mechanism therefor; a plurality of carriers adjustably supported on said frame, each provided with a plate adapted to engage the surface of the soil; two sets of angularly-disposed hoe-blades or cutters located at the under side of each plate, the blades of one set diverging from their front ends, and the blades of the other set converging from their front ends; means for raising and lowering said carriers independently or together; and a cultivator-share secured to each of said carriers.

36. In a machine of the class specified, the combination, with a support or frame, of running-gear therefor including steering mechanism for the front end of said frame; means for guiding the rear end of said frame; a plurality of shiftable carriers supported on said frame, each provided with two sets of angularly-disposed hoe-blades or cutters, the cutters or blades of one set diverging from their front ends, and the blades of the other set converging from their front ends; means for raising and lowering said carriers and comprising a rock-shaft mounted on said frame, a series of levers loosely mounted on said shaft, each in connection with one of said carriers, a rock-arm rigidly secured to said shaft and having connection with said carriers, and a lever for actuating said rock-shaft; means for locking said carriers in their raised position; and means for guiding said carriers to prevent lateral movement thereof.

37. In a machine of the class specified, the combination, with running-gear including steering mechanism, of a support or frame adjustably mounted on said running-gear; a plurality of adjustable carriers supported by said frame; means for raising and lowering said carriers, each of said carriers having a plate for engaging the soil; and a hoe-blade or cutter supported at the under side of each of said plates.

RICHARD J. GATLING.

Witnesses:
C. S. CAAMPION,
WM. H. BLODGETT.